United States Patent
Guo et al.

(10) Patent No.: US 8,656,778 B2
(45) Date of Patent: Feb. 25, 2014

(54) IN-PLANE CAPACITIVE MEMS ACCELEROMETER

(75) Inventors: Shuwen Guo, Burnsville, MN (US); Alexander Spivak, Eden Prairie, MN (US); Anita Fink, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 278 days.

(21) Appl. No.: 12/982,720

(22) Filed: Dec. 30, 2010

(65) Prior Publication Data

US 2012/0167685 A1 Jul. 5, 2012

(51) Int. Cl.
*G01P 15/125* (2006.01)
(52) U.S. Cl.
USPC ........................................... 73/514.32
(58) Field of Classification Search
USPC ........................................... 73/514.32
See application file for complete search history.

(56) References Cited

U.S. PATENT DOCUMENTS

| | | | |
|---|---|---|---|
| 4,574,327 A | 3/1986 | Wilner | |
| 4,609,968 A | 9/1986 | Wilner | |
| 4,736,629 A | 4/1988 | Cole | |
| 4,825,335 A | 4/1989 | Wilner | |
| 4,999,735 A | 3/1991 | Wilner | |
| 5,092,174 A * | 3/1992 | Reidemeister et al. | 73/514.32 |
| 5,205,171 A | 4/1993 | O'Brien et al. | |
| 5,404,749 A | 4/1995 | Spangler | |
| 5,454,266 A | 10/1995 | Chevroulet et al. | |
| 5,777,226 A | 7/1998 | Ip | |
| 5,900,550 A | 5/1999 | Menzel | |
| 5,992,233 A | 11/1999 | Clark | |
| 6,041,653 A | 3/2000 | Ichikawa et al. | |
| 6,065,341 A * | 5/2000 | Ishio et al. | 73/514.32 |
| 6,158,280 A | 12/2000 | Nonomura et al. | |
| 6,373,265 B1 | 4/2002 | Morimoto et al. | |
| 6,504,385 B2 | 1/2003 | Hartwell et al. | |
| 6,509,620 B2 | 1/2003 | Hartwell et al. | |
| 6,531,332 B1 | 3/2003 | Shkel et al. | |

(Continued)

FOREIGN PATENT DOCUMENTS

| | | |
|---|---|---|
| WO | WO 2005/059569 | 6/2005 |
| WO | WO 2010/136222 | 12/2010 |

OTHER PUBLICATIONS

Extended European Search Report, dated Jul. 12, 2012, for corresponding European Patent Application No. 11250891.6.

(Continued)

*Primary Examiner* — John Chapman, Jr.
(74) *Attorney, Agent, or Firm* — Edwards Wildman Palmer LLP; Scott D. Wofsy

(57) ABSTRACT

A system for determining in-plane acceleration of an object. The system includes an in-plane accelerometer with a substrate rigidly attached to an object, and a proof mass—formed from a single piece of material—movably positioned a predetermined distance above the substrate. The proof mass includes a plurality of electrode protrusions extending downward from the proof mass to form a gap of varying height between the proof mass and the substrate. The proof mass is configured to move in a direction parallel to the upper surfaces of each of the plurality of substrate electrodes when the object is accelerating, which results in a change in the area of the gap, and a change in capacitance between the substrate and the proof mass. The in-plane accelerometer can be fabricated using the same techniques used to fabricate an out-of-plane accelerometer and is suitable for high-shock applications.

19 Claims, 6 Drawing Sheets

(56) References Cited

U.S. PATENT DOCUMENTS

| | | | |
|---|---|---|---|
| 6,791,931 | B2 | 9/2004 | Eldredge |
| 6,841,992 | B2 | 1/2005 | Yue et al. |
| 6,854,330 | B2 | 2/2005 | Potter |
| 6,871,544 | B1 | 3/2005 | Selvakumar et al. |
| 6,912,902 | B2 | 7/2005 | Malametz et al. |
| 6,930,368 | B2 | 8/2005 | Hartwell et al. |
| 6,935,175 | B2 | 8/2005 | Eskridge et al. |
| 6,945,110 | B2 | 9/2005 | Selvakumar et al. |
| 6,981,416 | B2 | 1/2006 | Chen et al. |
| 7,022,543 | B2 | 4/2006 | Eskridge et al. |
| 7,142,500 | B2 | 11/2006 | Fasen et al. |
| 7,168,317 | B2 * | 1/2007 | Chen et al. ............ 73/504.04 |
| 7,469,588 | B2 | 12/2008 | LaFond et al. |
| 7,531,229 | B2 * | 5/2009 | Gomez et al. ............ 428/76 |
| 7,736,931 | B1 | 6/2010 | Guo |
| 8,079,262 | B2 | 12/2011 | Guo |
| 2005/0109108 | A1 | 5/2005 | Chen et al. |
| 2009/0107238 | A1 | 4/2009 | Guo |
| 2012/0073370 | A1 | 3/2012 | Schubert et al. |

OTHER PUBLICATIONS

M. I. Campbell: "An Automated Approach to Generating Novel MEMS Accelerometer Configurations," TEXMEMSIII: Texas-Area MEMS Workshop, Richardson, TX, Jun. 7, 2001, pp. 1-3.

J. Chae et al.: "An In-Plane High-Sensitivity, Low-Noise Micro-G Silicon Accelerometer," in Proc. IEEE MEMS, Jan. 2003, 466-469.

Y. de Coulon et al.: "Design and Test of a Precision Servoaccelerometer with Digital Output," The 7th International Conference on Solid-State Sensors and Actuators, Jun. 1993, pp. 832-835.

W. Henrion et al.: "Wide Dynamic Range Direct Digital Accelerometer," Tech Digest Solid State Sensors-Actuators Workshop, Jun. 1990, pp. 153-157.

C-H. Liu et al.: "Characterization of a High-Sensitivity Micromachined Tunneling Accelerometer with Micro-g Resolution," Journal of Microelectromechanical Systems, vol. 7, No. 2, Jun. 1998, pp. 235-244.

L. Ristic et al.: "A capacitive Type Accelerometer with Self-Test Feature Based on a Double-pinned Polysilicon Structure," Tech. Dig. 7th Int. Conf. Solid-State Sensors and Actuators (Transducers '93), Yokohama, Japan, Jun. 1993, pp. 810-812.

L. Ristic et al.: "Surface Micromachined Polysilicon Accelerometer," Solid-State Sensor and Actuator Workshop, 1992. 5th Technical Digest., IEEE, Jun. 1992, pp. 118-121.

T. V. Roszhart et al.: "An Inertial-Grade, Micromachined Vibrating Beam Accelerometer," ICSensors—8th International Conference on Solid-State Sensors and Actuators, Jun. 1995, pp. 4-19-4-22.

F. Rudolf et al.: "Precision Accelerometers with μg Resolution," Sensors and Actuators, A21-A23 (1990), pp. 297-302.

F. Rudolf et al.: "Silicon Microaccelerometer," Tech. Dig. 4th Int. Conf. Solid-State Sensors and Actuators (Transducers '87), Tokyo, Japan, Jun. 1987, pp. 395-398.

G. Schröpfer et al.: "Fabrication of a New Highly-Symmetrical, In-Plane Accelerometer Structure by Anisotropic Etching of (100) Silicon," J. Micromech. Microeng. vol. 7, No. 2, 1997, pp. 71-78.

S. J. Sherman et al.: "A Low cost Monolithic Accelerometer; Product/Technology Update," Technical Digest, Electron Devices Meeting, Dec. 1992. pp. 19.1.1-19.1.4.

K. Warren: "Navigation Grade Silicon Accelerometers with Sarificaially Etched SIMOX and BESOI Structure," Tech Digest Solid State Sensors-Actuators Workshop, Jun. 1994, pp. 69-72.

N. Yazdi et al.: "An All-Silicon Single-Wafer Micro-g Accelerometer with a Combine Surface and Bulk Micromachining Process," Journal of Microelectromechanical Systems, vol. 9, No. 4, Dec. 2000, pp. 544-550.

European Search Report dated Dec. 7, 2012 for corresponding EP Application No. 11250891.6.

K. Sharma, et al.: "Design Optimization of MEMS Comb Accelerometer," http://www.asee.org/documents/zones/zone1/2008/student/ASEE12008__0050__paper.pdf, Mar. 2008.

Communication pursuant to Article 94(3) EPC, dated Mar. 20, 2013, issued on corresponding European Patent Application No. 11 250 891.6-1558.

\* cited by examiner

IN-PLANE CAPACITIVE MEMS ACCELEROMETER

BACKGROUND OF THE INVENTION

1. Field of the Invention

The present invention relates to accelerometers and other force-sensing devices, and more particularly to a gun-hard, in-plane MEMS capacitive accelerometer that includes a proof mass formed from a single piece of material positioned above a plurality of electrodes on a substrate. When the substrate accelerates, the proof mass moves in a direction parallel to the upper surfaces of the substrate, changing the capacitance between the proof mass and the substrate. This change in capacitance can be used to measure the displacement and to determine the acceleration of an object to which the substrate is attached.

2. Description of Related Art

Accelerometers are a critical component in the Inertial Measurement Units (IMUs) commonly used in navigation and guidance systems for all types of vehicles. A typical IMU consists of three equal modules, each including a linear accelerometer, a gyroscopic rotational rate sensor, and associated electronics. These three-axis IMUs are used for navigation, guidance, and data-measurement systems in aerospace applications ranging from aircraft and spacecraft, to precision-guided missiles and artillery rounds. In many of these applications, the IMU is exposed to extreme vibrations and shock loads; it must be designed to withstand these harsh conditions.

Inertial Measurement Units capable of surviving harsh shock loads are known as gun-hard IMUs. These high-performance IMUs remain fully functional even when exposed to forces that are thousands of times stronger than the pull of gravity. Use of high-performance accelerometers and other components allow for reliable, consistent, and precise guidance of the vehicle or projectile on which the IMU is installed.

High-performance accelerometers with near micro-gravity resolution, high sensitivity, high linearity, and low bias drift are critical for use in gun-hard IMUs. Traditionally, IMUs included large mechanical accelerometers and conventional spinning mass gyroscopes. However, most current IMUs, and especially gun-hard, high-performance IMUs, are made using microelectromechanical systems (MEMS) fabrication techniques.

MEMS fabrication technology plays a critical role in ensuring that large mass, large capacitance, and small damping are simultaneously obtained in the accelerometer while achieving micro-gravity resolution. Silicon capacitive accelerometers have several advantages that make them very attractive for gun-hard IMUs. Silicon capacitive accelerometers have high sensitivity, good direct current response and noise performance, low drift, low temperature sensitivity, low power dissipation, and a simple structure. It would be beneficial to have a gun-hard, high-performance, three-axis accelerometer built on a single chip using MEMS fabrication techniques. But this requires building both out-of-plane and in-plane accelerometers on the chip using the same fabrication techniques.

Known in-plane accelerometer configurations include MEMS comb-finger accelerometers, where the sensing gaps are formed between side walls and the sensitivity is determined by the size of the sensing gaps. A conventional MEMS comb-finger accelerometer is shown in FIG. 7 and designated generally by numeral 700. Accelerometer 700 includes a proof mass or sensing plate 702 attached by springs to two anchors 704 and having a plurality of movable fingers 706. Movable fingers 706 are interdigitated with a plurality of fixed fingers 708, with a lateral gap formed between the movable and fixed fingers. The minimum size of the lateral gap is limited to between about $\frac{1}{10}$th and $\frac{1}{15}$th of the plate thickness by the aspect ratio of the Dry Reactive Ion Etching (DRIE) technology used to fabricate in-plane accelerometer 700. This means that the minimum lateral gap for a plate that is 75 µm (microns) thick is between 5.0 and 7.5 µm. Existing DRIE technology is only capable of producing gaps as small as 10 µm; it is not possible to fabricate a MEMS comb-finger, in-plane accelerometer using this technique for a plate that is 75 µm thick.

Other fabrication techniques combining surface micromachining and bulk micromachining can be used to reduce the lateral gap to 1.1 µm. Polysilicon deposition techniques are one example. However, the process flow for these techniques is very complicated—resulting in a low yield. Moreover, the resulting structure is fragile—making the structures unsuitable for high shock applications. These known techniques cannot be used to fabricate gun-hard MEMS accelerometers.

Additionally, the conventional comb-finger accelerometer configuration has inherent nonlinearity issues. To improve linearity, the change in the lateral gap must be limited to a small range, which leads to a small differential capacitance output.

Given these limitations, there is a compelling need for a gun-hard, high-performance, three-axis accelerometer that includes both an in-plane accelerometer and an out-of-plane accelerometer built on a single chip using the same MEMS fabrication techniques. The present invention addresses this need.

SUMMARY OF THE INVENTION

This disclosure is directed to systems and methods for determining in-plane acceleration of an object. The systems and methods will be more readily apparent to those having ordinary skill in the art from the following detailed description of the invention taken in conjunction with the several drawings described below.

A system for determining in-plane acceleration of an object is disclosed, including an in-plane accelerometer with a substrate rigidly attached to an object, and a proof mass—formed from a single piece of material—movably positioned a predetermined distance above the substrate. A plurality of first substrate electrodes extend upward from the substrate and alternate with a plurality of second substrate electrodes that also extend upward from the substrate. Each substrate electrode has a planar upper surface. The plurality of first substrate electrodes are electrically connected to one another, and the plurality of second substrate electrodes are electrically connected to one another. The proof mass includes a plurality of electrode protrusions extending downward from the proof mass to form a gap of varying height between the proof mass and the substrate. A first capacitor is formed between the proof mass and the plurality of first substrate electrodes, and a second capacitor is formed between the proof mass and the plurality of second substrate electrodes. The proof mass is configured to be held in an equilibrium position when the velocity of the object is constant, with each of the plurality of electrode protrusions being positioned over a portion of one first substrate electrode and a portion of an adjacent second substrate electrode when the proof mass is in the equilibrium position. The proof mass is configured to move in a direction parallel to the upper surfaces of each of the plurality of substrate electrodes when the object is accelerating. This results in a change in the area of the gap between the upper surface of each of the substrate electrodes and the proof mass.

A method of measuring in-plane acceleration of an object is also disclosed. The method includes the steps of: rigidly attaching a substrate to an object; securing a proof mass in an equilibrium position a predetermined distance above the substrate to form a gap of varying height between the proof mass and the substrate; forming a first differential capacitor between the proof mass and a plurality of first substrate electrodes, and forming a second differential capacitor between the proof mass and a plurality of second substrate electrodes, wherein the first substrate electrodes and second substrate electrodes are alternatingly positioned on the substrate; displacing the proof mass from the equilibrium position in a direction parallel to a planar upper face of the substrate electrodes by applying an acceleration force to the object; measuring a first change in capacitance in the first differential capacitor; measuring a second change in capacitance in the second differential capacitor; and using a circuit to convert the measured changes in capacitance to a voltage representing acceleration of the object.

An additional method of measuring in-plane acceleration of an object is also disclosed. That method includes the steps of: rigidly attaching a substrate to an object; suspending a proof mass above the substrate, the proof mass being constrained to move in only one direction; forming a differential capacitor between the proof mass and the substrate, wherein the proof mass includes a plurality of electrode protrusions with each electrode protrusion centered above two substrate electrodes such that an area between an upper planar surface of each substrate electrode and the proof mass changes when the proof mass moves in a direction parallel to the upper planar surfaces of the substrate electrode; displacing the proof mass by applying an acceleration force to the object; measuring a change in capacitance between each substrate electrode and the proof mass; using a circuit to convert the measured change in capacitance to a voltage representing acceleration of the object; outputting a voltage from the circuit that is proportional to the change in area between the upper planar surface of each substrate electrode and the proof mass.

BRIEF DESCRIPTION OF THE DRAWINGS

So that those skilled in the art will readily understand how to implement the systems and methods for determining in-plane acceleration of an object, preferred embodiments of the systems and methods will be described in detail below with reference to the following figures.

DETAILED DESCRIPTION OF THE PREFERRED EMBODIMENTS

There is a compelling need for a gun-hard, high-performance, three-axis inertial measurement unit that includes both in-plane accelerometers and out-of-plane accelerometers on a single chip. A novel out-of-plane MEMS accelerometer suitable for this purpose is described in U.S. patent application Ser. No. 11/978,090, filed Oct. 26, 2007, and titled "Pendulous Accelerometer with Balanced Gas Damping." That application, which is incorporated herein by reference, describes a pendulous capacitive accelerometer with an asymmetric proof mass. The pendulous sensing plate includes a first side that is substantially hollow and a second side that is solid. The out-of-plane accelerometer described in that application uses a 75 μm (micron) silicon-on-insulator (SOI) layer as a sensing structure. Such asymmetric solid/hollow proof mass sensor structures exhibit higher sensitivity than surface micromachined rocking structures because of the relatively thick proof mass and narrow vertical gap between the proof mass and a substrate of the out-of-plane pendulous accelerometer.

This disclosure describes an in-plane accelerometer that can be fabricated using techniques similar to those used to fabricate the out-of-plane pendulous accelerometer. Examples of these fabrication techniques are disclosed in U.S. Pat. No. 7,736,931, issued Jun. 15, 2010 and titled "Wafer Process Flow for a High Performance MEMS Accelerometer, which is also incorporated herein by reference.

Figure 7:
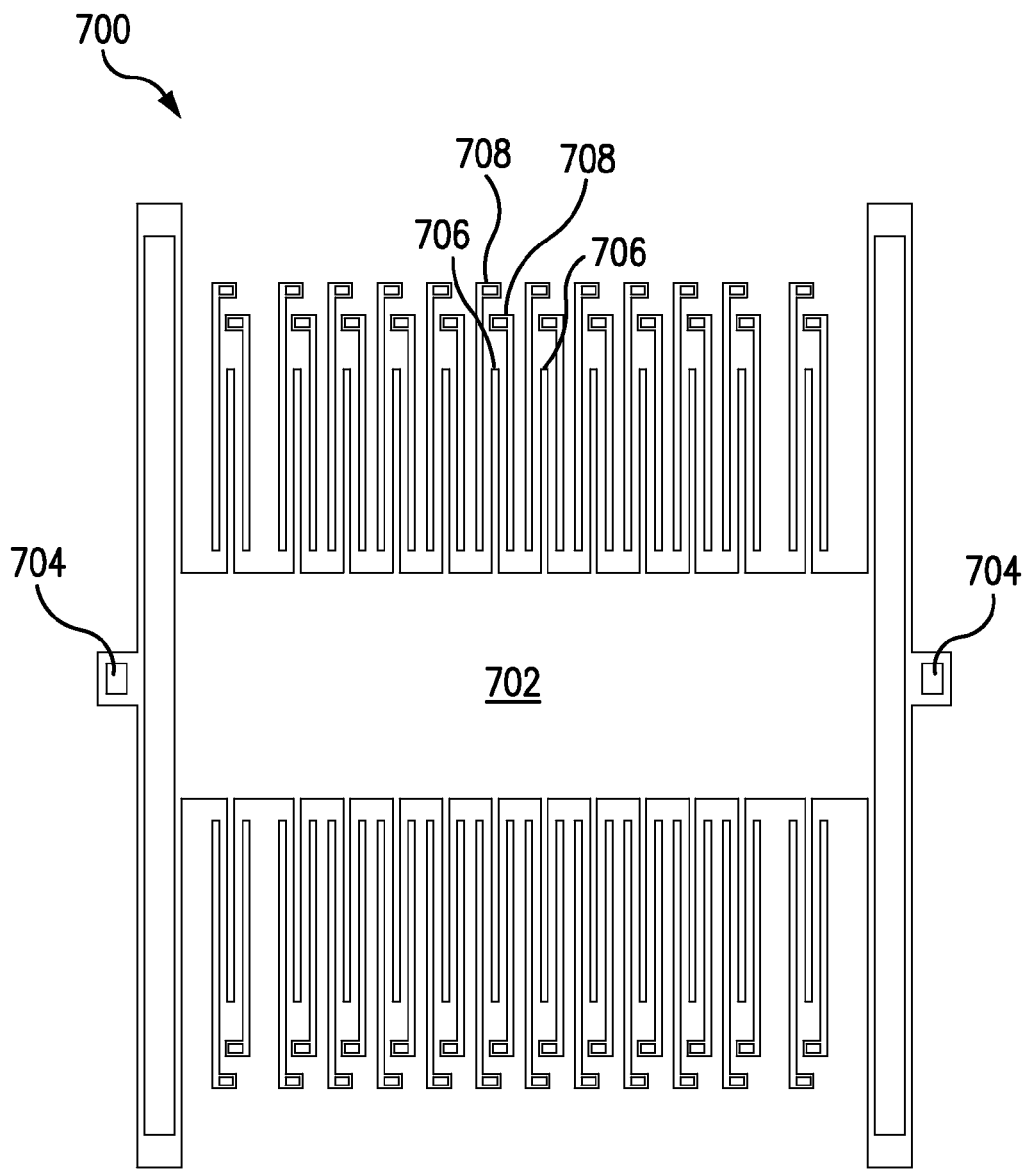
FIG. 7 is a top view of a prior-art in-plane accelerometer with fixed fingers interdigitated with movable fingers to form lateral sensing gaps.

This disclosure describes a gun-hard, in-plane MEMS accelerometer that measures differential capacitance as a proof mass positioned above a substrate moves in a direction parallel to an upper surface of the substrate. To obtain a high-performance, gun-hard, low-noise, in-plane accelerometer, it is necessary to increase the proof mass size, reduce the sensing gaps, and reduce damping. But in a thick proof mass MEMS process, it is much more difficult to reduce the lateral gap typical in an in-plane accelerometer, as shown in the conventional in-line accelerometer of FIG. 7, than it is to reduce the vertical gap typical in an out-of-plane accelerometer.

The present invention is an offset comb-finger, in-plane accelerometer that can be fabricated using the same technology used for fabricating out-of-plane accelerometers. The in-plane accelerometer may use a thick proof mass and a vertical gap that can be made as small as 1.0 μm. Because it uses area change instead of gap change to measure capacitance, the in-plane accelerometer described in this disclosure has a linear change over acceleration. It is also suitable for open loop accelerometer design. Most importantly, the fabrication process flow is the same as that of the existing out-of-plane accelerometer, which allows the in-plane accelerometer and out-of-plane accelerometer to be fabricated on a single chip using the same fabrication techniques.

Figure 1:
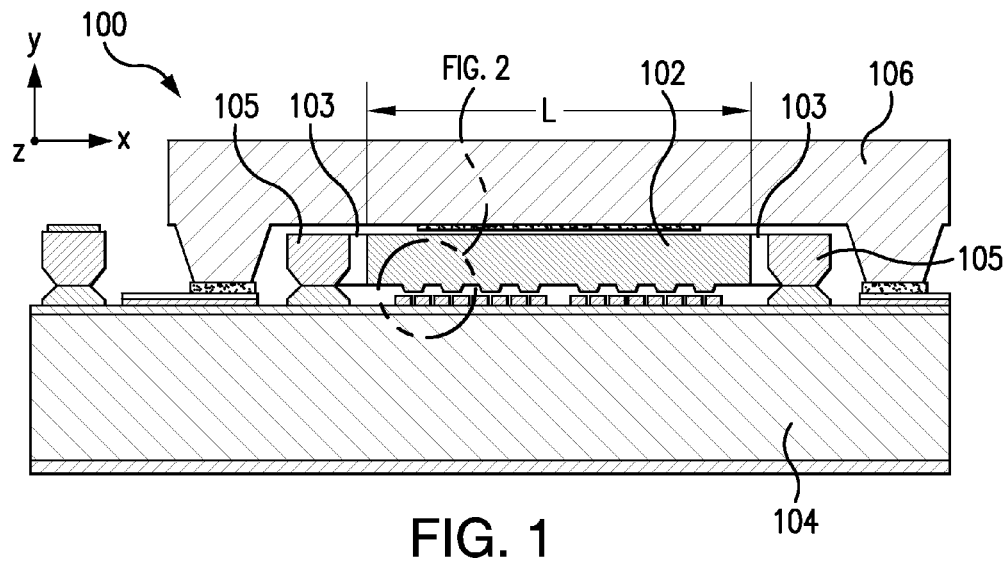
FIG. 1 is a cross-sectional view of an in-plane accelerometer according to the present invention, showing a proof mass suspended above a substrate and enclosed with a topping wafer.

Reference will now be made in detail to the present preferred embodiments of the in-plane accelerometer, examples of which are shown in the drawings. For purposes of explanation and illustration, and not limitation, a cross-sectional view of an in-plane, offset comb-fingered accelerometer is shown in FIG. 1 and is designated generally by reference numeral 100. In-plane accelerometer 100 includes a proof mass 102, a substrate 104, and a topping wafer 106. The topping wafer provides shock protection for proof mass 102 and may be glass frit bonded to substrate 104. A fusion bond or a eutectic bond could also be used to bond topping wafer 106 to substrate 104. Accelerometer 100 may also include a guard ring 105 surrounding proof mass 102. Substrate 104 is rigidly attached to an object, while proof mass 102 is suspended above substrate 104 by springs 103 or by other suitable means, which allows accelerometer 100 to determine the acceleration of the object by measuring the differential change in capacitance between proof mass 102 and substrate 104. In one exemplary embodiment, proof mass 102 may be movably attached to a wafer that is in turn fusion bonded to substrate 104.

Figure 2:
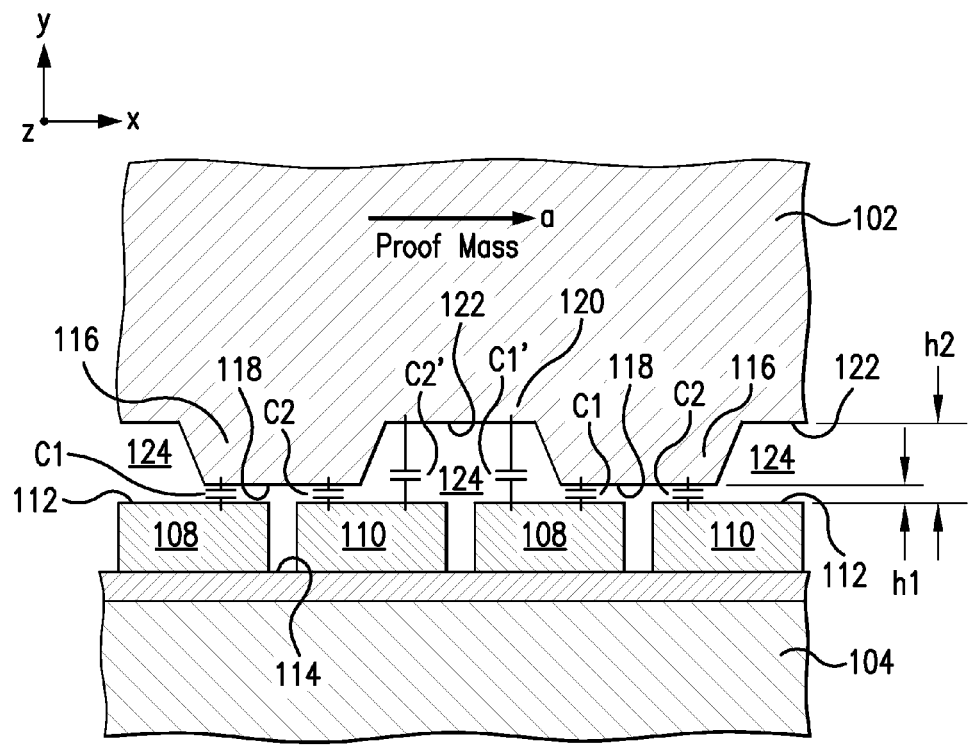
FIG. 2 is a detailed view of a portion of the in-plane accelerometer shown in FIG. 1, with the proof mass in an initial position.

FIG. 2 is a detailed view of a portion of accelerometer 100, showing details of proof mass 102 and substrate 104. Substrate 104 may comprise a silicon-on-insulator (SOI) material. As shown, substrate 104 includes a plurality of first substrate electrodes 108 extending upward from substrate 104, and a plurality of second substrate electrodes 110, which also extend upward from substrate 104. The first and second substrate electrodes 108, 110 are arranged in an alternating pattern on substrate 104. In other words, for each of first substrate electrodes 108, the immediately adjacent substrate electrode is one of the second substrate electrodes 110, and for each of the second substrate electrodes 110, the immediately adjacent substrate electrode is once of the first substrate electrodes 108. Each of the first and second substrate electrodes have a planar upper surface 112 a predetermined distance above a planar upper surface 114 of substrate 104. Planar upper surfaces 112 of the first and second substrate electrodes 108, 110 are positioned parallel to the planar upper surface 114 of substrate 104. In one exemplary embodiment, substrate electrodes 108, 110 have a height ranging from about 0.5 μm to about 4 μm.

FIG. 2 also shows a plurality of electrode protrusions 116 which extend downward from proof mass 102 toward substrate 104. Proof mass 102 is formed from a single piece of material. In one exemplary embodiment, the material is a semiconductor such as silicon. Because proof mass 102 is formed from a single piece of material, these protrusions 116 are formed by removing material from proof mass 102; the protrusions are an integral part of proof mass 102 and are not formed separately. Each electrode protrusion 116 has a lower planar surface 118. In the exemplary embodiment shown in FIGS. 1-3, electrode protrusions 116 are formed using a potassium hydroxide (KOH) etching process, which produces sidewalls on each electrode protrusion 116 with an angle of 54.7° with respect to lower planar surface 118. A valley 120 is formed in an area adjacent each electrode protrusion 116, for example, between two electrode protrusions 116. Valley 120 includes a planar valley surface 122 that is parallel to lower planar surfaces 118 of the electrode protrusions 116.

Proof mass 102 of accelerometer 100 is positioned a predetermined distance above substrate 104 such that a gap 124 is formed between proof mass 102 and substrate 104. Because electrode protrusions 116 extend downward and because first and second substrate electrodes 108, 110 are positioned on top of the substrate, the height of gap 124 between proof mass 102 and substrate 104 varies along the length L of proof mass 102.

Proof mass 102 is movably positioned above substrate 104 by one or more springs 103. The design of the springs is critical for obtaining high sensitivity and low cross talk. Cross talk is the undesired capacitive coupling from one circuit to another. Because in-plane accelerometer 100 is designed to measure acceleration along a single axis, it is designed to eliminate cross talk.

The key trade-off in the spring design is balancing sensitivity with cross talk. The springs should be flexible in the x-direction but stiff in the z-direction and in the y-direction. As shown in FIG. 2, the x-direction extends along the length of proof mass 102, parallel to lower planar surfaces of electrode protrusions 116. The y-direction is perpendicular to the x-direction, and the z-direction extends directly out of the page as shown in FIG. 2. To achieve rigidity in the y- and z-directions while maintaining flexibility in the x-direction, and to prevent cross talk, the springs should be very thin in the x-direction and relatively thick in the y- and z-directions. In one exemplary embodiment the width of the springs in the x-direction is the same as the width of proof mass 102 in the x-direction. In other words, the spring and the proof mass have the same thickness.

In designing the springs, the first mode of the resonant frequency of the springs should be kept away from the second and third mode of the resonant frequency. Spring design parameters are listed in Table 1 below.

| In-Plane Accelerometer Description | Spring size (μm) | Resonant Freq 1 (Hz) | Resonant Freq 2 (Hz) | Resonant Freq 3 (Hz) | Fusion bond Misalignment (μm) | Cross talk in z-direction | Capacitive sensitivity (pF/g) |
|---|---|---|---|---|---|---|---|
| Design 1 | 10 × 780 × 75 | 2088.4 | 14303 | 19706 | 2 | 7.01% | 0.03 |
| Design 2 | 5 × 390 × 75 | 2032.0 | 22338 | 40715 | 2 | 3.70% | 0.032 |
| Design 3 | 3 × 220 × 75 | 2195.8 | 26116 | 62045 | 2 | 2.20% | 0.027 |
| Design 4 | 3 × 220 × 75 | 2195.8 | 26116 | 62045 | 0.5 | 1.85% | 0.027 |

As can be seen from the table, capacitive sensitivity is dependent on the first-mode resonant frequency. The lower the first-mode frequency, the higher the capacitive sensitivity. Cross talk is dependent on the second-mode resonant frequency; the higher the second-mode frequency, the lower the cross talk. When capacitive sensitivity is fixed, a thinner spring can achieve lower cross talk. The minimum width of the spring is limited by capabilities of the fabrication process used, for example, by the aspect ratio of a Dry Reactive Ion Etch (DRIE) process.

When the object to which substrate 104 is attached is at rest or in an equilibrium position, that is, when the velocity of the object is constant (no acceleration), proof mass 102 is held in position above substrate 104 by springs 130 such that each of the plurality of electrode protrusions overlaps a portion of one first substrate electrode 108 and a portion of the adjacent second substrate electrode 110.

Each of the first substrate electrodes 108 are electrically connected to one another, and each of the second substrate electrodes are likewise electrically connected to one another. As a result, a first capacitor is formed between proof mass 102 and the plurality of first substrate electrodes 108, and a second capacitor is formed between proof mass 102 and the plurality of second substrate electrodes 110. In one exemplary embodiment, substrate electrodes 108, 110 are arranged symmetrically, such that when the acceleration of the object is equal to zero, that is, when proof mass 102 is in the equilibrium position, the capacitance of the first capacitor is equal to the capacitance of the second capacitor. Because both groups of substrate electrodes are fixed, the area of gap 124, and the overall capacitance of each capacitor changes when substrate 104 is accelerated and proof mass 102—with its electrode protrusions 116—moves in the x-direction, that is, in a direction parallel to planar upper surface 112 of the first and second substrate electrodes.

As shown in FIG. 2, because of the shape and positioning of electrode protrusions 116 on proof mass 102, each first substrate electrode 108 has a first capacitance C1 between lower planar surface 118 of the electrode protrusion and planar upper surface 112 of first substrate electrode 108, and a second capacitance C1' between valley planar surface 122 of proof mass 102 and planar upper surface 112 of first substrate electrode 108. Similarly each second electrode protrusion has a first capacitance C2 between lower planar surface 118 of the electrode protrusion and planar upper surface 112 of second substrate electrode 110, and a second capacitance C2' between valley planar surface 122 of proof mass 102 and planar upper surface 112 of second substrate electrode 110.

Figure 3:
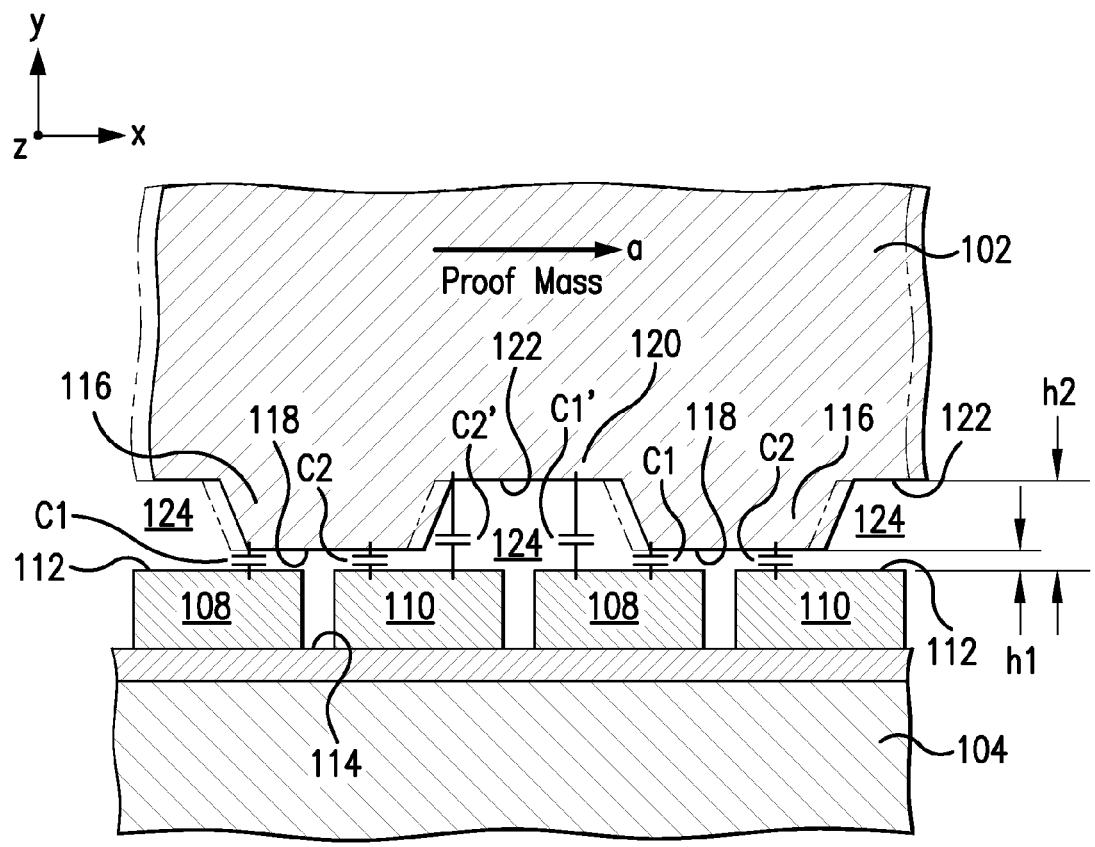
FIG. 3 is an additional detailed view of the in-plane accelerometer shown in FIG. 1, with the proof mass in a second position after being displaced due to an acceleration.

When an acceleration force a is applied to proof mass 102, proof mass 102 moves from the equilibrium position shown in FIG. 2, to a second position, shown in FIG. 3. As proof mass 102 moves from the equilibrium position, the capacitance C2 increases and capacitance C1 decreases due to the area change in gap 124 between proof mass 102 and substrate electrodes 108, 110. On the other hand, capacitance C2' decreases and capacitance C1' increases as the proof mass moves from the equilibrium position. In other words, as proof mass 102 moves to in the x-direction as shown, the area of gap 124 between proof mass 102 and the planar upper surface 112 of first electrode substrate 108 increases, while the area of gap 124 between proof mass 102 and the planar upper surface of second electrode substrate 110 decreases.

The height of gap 124 varies along the length L of proof mass 102. For example, as shown in FIG. 2, gap 124 may have a first height h1 between lower planar surfaces 118 of electrode protrusions 116 and planar upper surfaces 112 of substrate electrodes 108, 110; and a second height h2 between valley planar surfaces 122 and planar upper surfaces 112 of substrate electrodes 108, 110.

Second height h2 is much greater than first height h1. For example, h2 may be between ten and twenty times greater than h1. Capacitance decreases with distance between electrodes; as a result of the height difference between h1 and h2, capacitance C1 is much greater than C1' and capacitance C2 is much greater than C2'. So the overall differential changes in capacitance are dominated by C1 and C2.

There are several advantages of the structure described above for accelerometer 100. First, if a thick proof mass (greater than 50 μm) is used, the small height h1 of gap 124 is more easily obtained with known process capabilities than are the lateral gaps of prior art in-line accelerometers. Additionally there is no stiction problem at high-g loads in the offset comb-finger in-line accelerometer 100 described above. Accelerometer 100 is also more robust than a lateral comb-finger structure and suitable for use in gun-hard devices.

Figure 4:
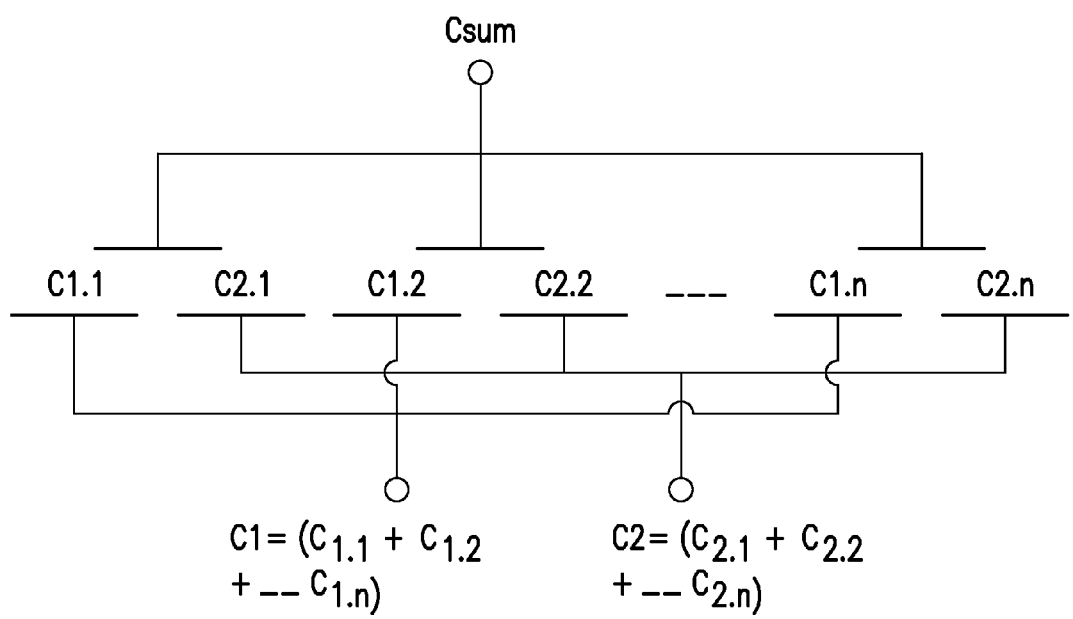
FIG. 4 is a circuit diagram showing an equivalent circuit for the capacitor formed by the in-plane accelerometer of the present invention.

FIG. 4 illustrates an equivalent circuit to the circuit created by in-plane accelerometer 100. As shown, the circuit includes two capacitors. A first capacitor with capacitance C1 is formed between proof mass 102 and first substrate electrodes 108. A second capacitor with capacitance C2 is formed between proof mass 102 and second substrate electrodes 110. Again, each of the first substrate electrodes 108 are electrically connected to one another. Similarly, each of the second substrate electrodes 110 are electrically connected. So as shown in FIG. 4, the first and second capacitors consists of a series of small capacitors; capacitance C1 is equal to the sum of the capacitance in each of these smaller capacitors, such that $C1=C1.1+C1.2+ \ldots +C1.n$; where n is an integer representing the number of first substrate electrodes 108 on substrate 104. Likewise, capacitance C2 is equal to the sum of the capacitance in each of the smaller capacitors formed between proof mass 102 and second electrodes 110, such that $C2=C2.1+C2.2+ \ldots +C2.n$, where n is an integer representing the number of second substrate electrodes 110 on substrate 104.

In one exemplary embodiment, the nominal capacitance values of C1 and C2 are equal at about 7.5 pF (picofarads) when proof mass 102 and substrate electrodes 108, 110 are symmetrically positioned—that is, when each electrode protrusion 116 is aligned above first substrate electrode 108 and second substrate electrode 110 such that the area of overlap between a first substrate electrode 108 and an electrode protrusion 116 is the same as the overlap between the adjacent second substrate electrode 110 and the same electrode protrusion 116. FIG. 2 shows proof mass 102 with electrode protrusions 116 symmetrically positioned above substrate electrodes 108, 110.

A difference in capacitive values for C1 and C2 can be caused by a misalignment of the fusion bond between proof mass 102 and substrate 104. The tolerance of the current fusion bond misalignment is about 5 μm, meaning that the nominal capacitance of C1 and C2 could vary from 2.75 to 13.75 pF.

The total capacitance, Csum, of accelerometer 100, is equal to the sum of capacitance C1 and capacitance C2. The common mode capacitive change in C1 and C2 is therefore canceled; only differential change will be amplified. This means that the z-axis cross talk, which leads to common capacitive change, is minimized.

Figure 5:
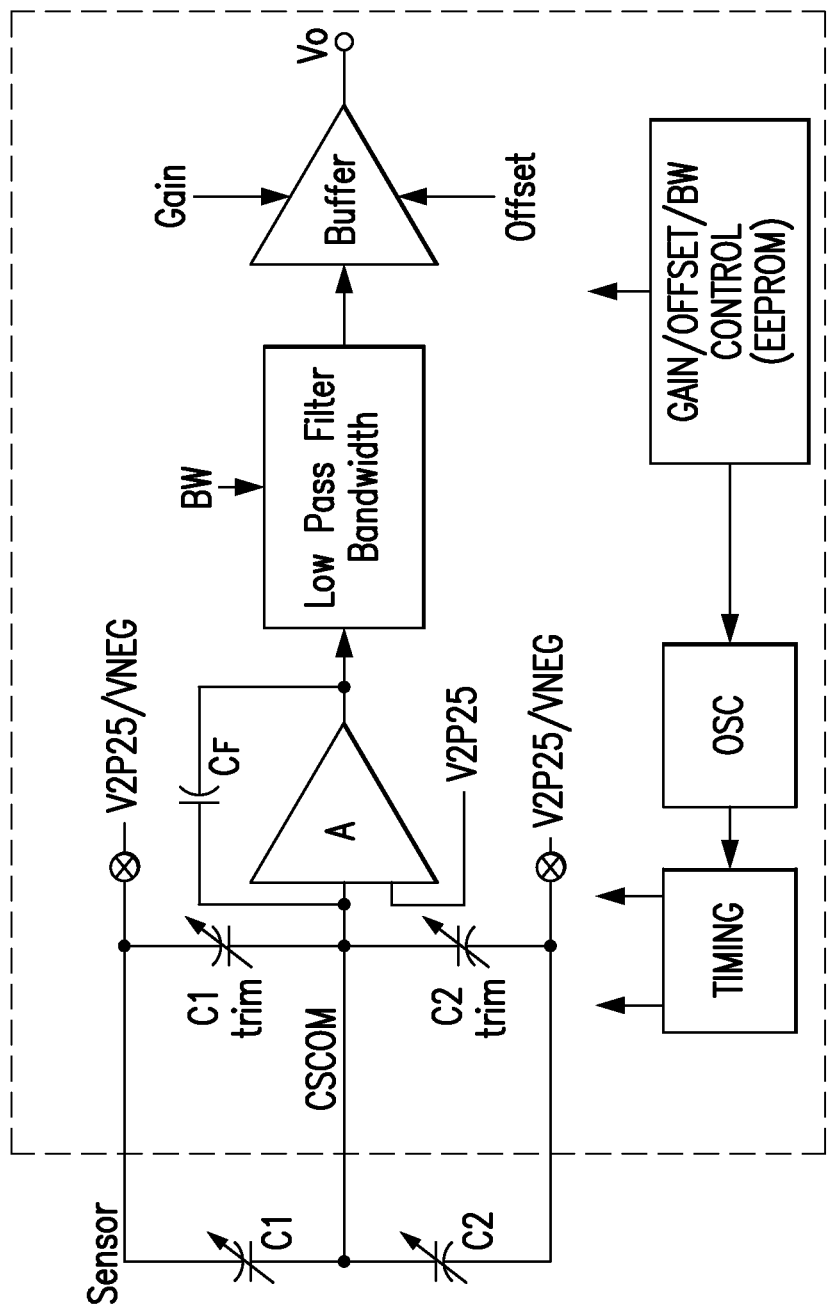
FIG. 5 is a functional block diagram of the sensor interface circuit of the present invention that receives input from the accelerometer in the form of a change in capacitance, and converts the input into a voltage output representing the acceleration of the proof mass.

FIG. 5 is an example of a circuit that may interface with in-plane accelerometer 100 to convert the measured difference in capacitance between proof mass 102 and substrate electrodes 108, 110 to an output voltage representing the acceleration of substrate 104, and by extension, the acceleration of the object to which the substrate is rigidly attached. As shown in FIG. 5, the circuit may included a built-in capacitor array that can be used to balance C1 and C2 and to minimize the bias off-set. C1_trim provides 0.2-10 pF range for trimming. The capacitor array includes 9 bits of programmability in 19 fF+/−20% steps. The total differential input sensing capacitors are as follows: C1T=C1+C1_trim; C2T=C2+C2_trim.

In one exemplary embodiment, the primary natural resonant frequency of the proof mass is 1890 Hz, and the maximum beam bending along the x-axis is about 2.1 μm. Because the fusion bond misalignment tolerance is 5 μm, the minimum overlap between electrode protrusions 116 and substrate electrodes 108, 110 has to be greater than 2.1 μm. So the overlap in layout design should be larger than 7.1 μm.

In one exemplary embodiment, the width of each substrate electrode 108, 110 is 15 μm and the width of electrode protrusion 116 is 20 μm to ensure that the substrate electrodes are covered by electrode protrusion 116, even with up to 5 μm of misalignment. If the misalignment tolerance can be reduced, then the width of the substrate electrodes can also be reduced. In that case, the number of substrate electrodes can be increased, which will increase the sensitivity of accelerometer 100. A misalignment tolerance of less than 1 μm can be achieved using a fusion-bond-alignment machine, such as the EVG SmartView® Automated Bond Alignment System, available from the EV Group of Austria.

Figure 6:
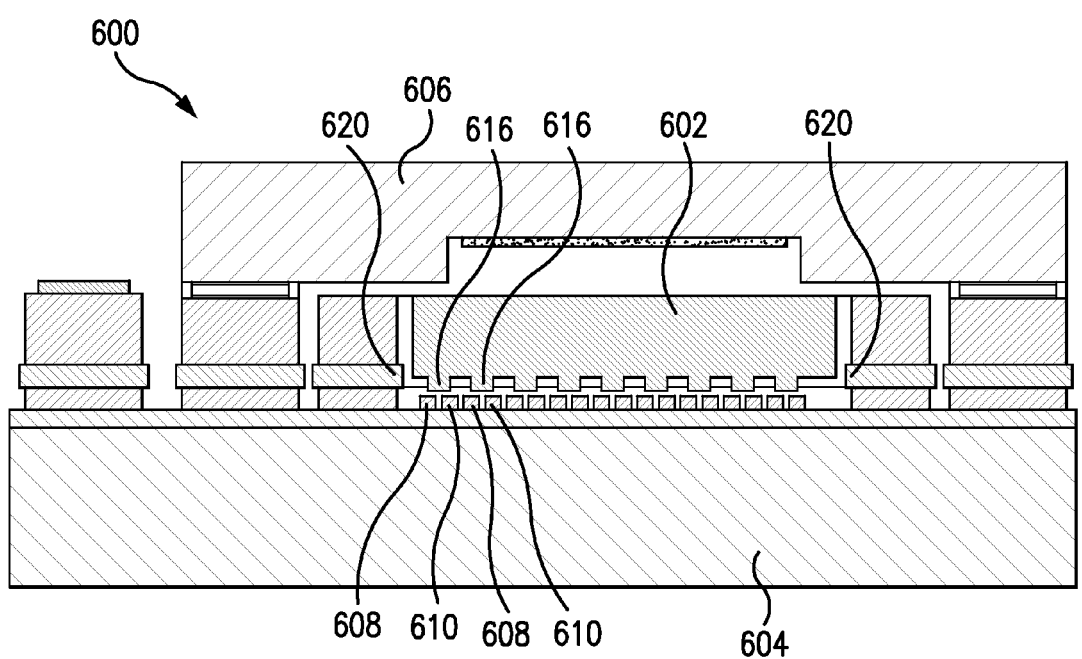
FIG. 6 is an cross-sectional view of an alternate embodiment of the in-plane accelerometer of the present invention, showing electrode protrusions on the proof mass formed by a Dry Reactive Ion Etching (DRIE) process.

An alternative design of an in-plane accelerometer according to the present invention is shown in FIG. 6 and designated generally by reference numeral 600. In-plane accelerometer 600 is similar to the previously described in-plane accelerometer, and includes a proof mass 602, a substrate 604 and a topping wafer 606. As shown, proof mass 602 is movable positioned above the substrate. Substrate 604 includes a plurality of first substrate electrodes 608, which are electrically connected to one another, and a plurality of second substrate electrodes 610, which are also electrically connected to one another, similar to the electrodes described with regard to in-plane accelerometer 100.

Unlike in-plane accelerometer 100 shown in FIG. 1, in-plane accelerometer 600 has a plurality of electrode fingers 616 formed by a Dry Reactive Ion Etching (DRIE) process rather than by a potassium hydroxide (KOH) etching process. As a result, the side walls of electrode fingers 616 are vertical rather than at a slope of 54.7 degrees. The vertical sidewalls of electrode fingers 616 help to minimize the parallel stray capacitance of C1 and C2. Additionally, lateral bumps 620 may be added to the structure of accelerometer 600 to prevent the springs from cracking during high shock loads.

While the systems and methods for determining in-plane acceleration of an object have been shown and described with reference to preferred embodiments, those skilled in the art will readily appreciate that various modifications may be made to the systems and methods of this disclosure without departing from the scope of the invention as described in the appended claims and their equivalents.

The invention claimed is:

1. An in-plane accelerometer, comprising:
a substrate rigidly attached to an object;
a plurality of first substrate electrodes extending upward from the substrate and alternating with a plurality of second substrate electrodes extending upward from the substrate, with each substrate electrode having a planar upper surface, the plurality of first substrate electrodes being electrically connected to one another and the plurality of second substrate electrodes being electrically connected to one another;
a proof mass formed from a single piece of material, the proof mass being positioned a predetermined distance above the substrate and including a plurality of electrode protrusions extending downward from the proof mass to form a gap of varying height between the proof mass and the substrate, wherein a first capacitor is formed between the proof mass and the plurality of first substrate electrodes, and a second capacitor is formed between the proof mass and the plurality of second substrate electrodes;
a spring configured and adapted to movably position the proof mass relative to the substrate, the spring flexible in a first direction parallel to the planar upper surfaces of the substrate electrodes and stiff in a second direction substantially perpendicular to the first direction; and
a topping wafer bonded to the substrate and configured and adapted to provide shock protection for the proof mass;
wherein the proof mass is configured to be held in an equilibrium position when the velocity of the object is constant, with each of the plurality of electrode protrusions being positioned over a portion of one first substrate electrode and a portion of an adjacent second substrate electrode when the proof mass is in the equilibrium position;
wherein the proof-mass is configured to move in a direction parallel to the upper surfaces of each of the plurality of substrate electrodes when the object is accelerating, thus changing an area of the gap between the upper surface of each of the substrate electrodes and the proof mass, and
wherein the accelerometer includes lateral bumps configured and adapted to prevent the spring from cracking during high shock loads, the lateral bumps defined by structure operatively disposed between a first section coupled to the substrate and a second section offset from the topping wafer, the lateral bumps extending in the first direction beyond the first and second sections.

2. The in-plane accelerometer of claim 1, wherein the proof mass is fainted from a single piece of silicon.

3. The in-plane accelerometer of claim 1, wherein the capacitance of the first capacitor and the capacitance of the second capacitor are equal when the proof mass is in the equilibrium position.

4. The in-plane accelerometer of claim 1, wherein the plurality of electrode protrusions comprise a plurality of fingers formed using a Deep Reactive-Ion Etching (DRIE) process such that the side walls of each of the fingers are vertical.

5. The in-plane accelerometer of claim 1, wherein the plurality of electrode protrusions are etched from the material using potassium hydroxide (KOH) so that the side walls of the protrusions have an angle of 54.7 degrees.

6. The in-plane accelerometer of claim 1, wherein the proof mass includes a first planar surface formed between each pair of adjacent electrode protrusions and a second planar surface formed on each of the electrode protrusions, with both the first and second planar surfaces being parallel to the planar upper surface of each of the substrate electrodes.

7. The in-plane accelerometer of claim 6, wherein a first distance between each of the first planar surfaces and a corresponding planar upper surface of one of the substrate electrodes is greater than a second distance between each of the second planar surfaces and the same planar upper surface of one of the substrate electrodes.

8. The in-plane accelerometer of claim 7, wherein the first distance is at least ten times larger than the second distance.

9. The in-plane accelerometer of claim 1, wherein the proof mass is held in the equilibrium position by the spring, and the spring permits movement only in a direction parallel to the planar upper surfaces of the substrate electrodes.

10. The in-plane accelerometer of claim 9, wherein the cross talk of the spring in a direction perpendicular to the planar upper surfaces of the substrate electrodes is less than 3%.

11. The in-plane accelerometer of claim 1, wherein the proof mass has a thickness of approximately 75 μm.

12. The in-plane accelerometer of claim 1, wherein the height of each substrate electrode is between 2 μm and 4 μm.

13. The in-plane accelerometer of claim 1, further comprising a guard ring surrounding the proof mass.

14. The in-plane accelerometer of claim 1, wherein the proof mass is movably attached to the wafer, and the wafer is fusion bonded to the substrate.

15. A method of measuring in-plane acceleration of an object, the method comprising the steps of:
  rigidly attaching a substrate to an object;
  securing a proof mass in an equilibrium position a predetermined distance above the substrate to form a gap of varying height between the proof mass and the substrate;
  forming a first differential capacitor between the proof mass and a plurality of first substrate electrodes, and forming a second differential capacitor between the proof mass and a plurality of second substrate electrodes, wherein the first substrate electrodes and second substrate electrodes are alternatingly positioned on the substrate;
  displacing the proof mass from the equilibrium position in a direction parallel to a planar upper face of the substrate electrodes by applying an acceleration force to the object;
  measuring a first change in capacitance in the first differential capacitor;
  measuring a second change in capacitance in the second differential capacitor; and
  using a circuit to convert the measured changes in capacitance to a voltage representing acceleration of the object,
  wherein securing the proof mass includes providing:
  a spring configured and adapted to movably position the proof mass relative to the substrate, the spring flexible in a first direction parallel to planar upper surfaces of the substrate electrodes and stiff in a second direction substantially perpendicular to the first direction;
  a topping wafer bonded to the substrate and configured and adapted to provide shock protection for the proof mass; and
  a plurality of lateral bumps configured and adapted to prevent the spring from cracking during high shock loads, the lateral bumps defined by structure operatively disposed between a first section coupled to the substrate and a second section offset from the topping wafer, the lateral bumps extending in the first direction beyond the first and second sections.

16. The method of claim 15, further comprising summing the first change in capacitance with the second change in capacitance in the circuit.

17. The method of claim 15, further comprising using the circuit to amplify the differential change and to minimize the common capacitive change measured in the first and second capacitors.

18. The method of claim 15, wherein the steps of forming a first differential capacitor and a second differential capacitor comprise centering an electrode protrusion of the proof mass between each pair of adjacent first and second substrate electrodes.

19. A method of determining in-plane acceleration of an object, the method comprising the steps of:
  rigidly attaching a substrate to an object;
  suspending and securing a proof mass above the substrate, the proof mass being constrained to move in only one direction;
  forming a differential capacitor between the proof mass and the substrate, wherein the proof mass includes a plurality of electrode protrusions with each electrode protrusion centered above two substrate electrodes such that an area between an upper planar surface of each substrate electrode and the proof mass changes when the proof mass moves in a direction parallel to the upper planar surfaces of the substrate electrode;
  displacing the proof mass by applying an acceleration force to the object;
  measuring a change in capacitance between each substrate electrode and the proof mass;
  using a circuit to convert the measured change in capacitance to a voltage representing acceleration of the object; and
  outputting a voltage from the circuit that is proportional to the change in area between the upper planar surface of each substrate electrode and the proof mass,
  wherein suspending and securing the proof mass above the substrate includes providing:
  a spring configured and adapted to movably position the proof mass relative to the substrate, the spring flexible in a first direction parallel to the planar upper surfaces of the substrate electrodes and stiff in a second direction substantially perpendicular to the first direction,
  a topping wafer bonded to the substrate and configured and adapted to provide shock protection for the proof mass, and
  a plurality of lateral bumps configured and adapted to prevent the spring from cracking during high shock loads, the lateral bumps defined by structure operatively disposed between a first section coupled to the substrate and a second section offset from the topping wafer, the lateral bumps extending in the first direction beyond the first and second sections.

* * * * *